United States Patent [19]

Kawamata

[11] Patent Number: 4,548,772
[45] Date of Patent: Oct. 22, 1985

[54] SURFACE SMOOTHING METHOD FOR MAGNETIC RECORDING MEDIUM

[75] Inventor: Toshio Kawamata, Odawara, Japan

[73] Assignee: Fuji Photo Film Co., Ltd., Japan

[21] Appl. No.: 522,221

[22] Filed: Aug. 11, 1983

[51] Int. Cl.⁴ .............................................. B29C 17/00
[52] U.S. Cl. .................... 264/26; 156/272.4; 219/10.41; 219/10.61 R; 264/28; 264/106; 264/DIG. 46; 425/174.8 R
[58] Field of Search ...................... 264/26, 28, 25, 106, 264/DIG. 46; 156/272.4; 425/147.8 R, 174.8 E; 219/10.41, 10.61, 10.61 A, 10.75, 10.49 R, 10.49 A

[56] References Cited

U.S. PATENT DOCUMENTS

| | | | |
|---|---|---|---|
| 2,485,238 | 10/1949 | Hickok | 264/26 |
| 2,761,941 | 9/1956 | Ardichrili | 219/10.61 A |
| 2,951,139 | 8/1960 | Washburn | 219/10.61 |
| 3,330,932 | 7/1967 | Gros | 219/10.41 |
| 3,488,411 | 1/1970 | Goldman | 425/174.8 |
| 3,702,912 | 11/1972 | Greenberger | 219/10.61 |
| 4,180,717 | 12/1979 | Lenk | 219/10.61 A |

Primary Examiner—James Lowe
Attorney, Agent, or Firm—Murray, Whisenhunt and Ferguson

[57] ABSTRACT

The surface of a flexible magnetic recording medium is continuously smoothed between at least one set of two rolls at least one of which is a metal roll. The rolls serve as electrodes of a high-frequency dielectric heater. A refrigerant is fed to the electrodes, and a high frequency is applied to the electrodes while the recording medium is passed and pressed between the rolls.

5 Claims, 3 Drawing Figures

SURFACE SMOOTHING METHOD FOR MAGNETIC RECORDING MEDIUM

BACKGROUND OF THE INVENTION

1. Field of the Invention

This invention relates to a method of smoothing the surface of a flexible magnetic recording medium. This invention particularly relates to a method of smoothing the surface of a flexible magnetic recording medium wherein the flexible magnetic recording medium is passed through and pressed between at least one set of two rolls at least one of which is a metal roll, thereby to smooth the magnetic surface of the medium.

2. Description of the Prior Art

As techniques for smoothing the surface of a magnetic recording medium, the following methods have heretofore been known widely:

(1) A method wherein the dispersant and the dispersing method used at the step of preparing a magnetic coating solution are improved to form a magnetic layer having a relatively smooth surface at the step immediately after the coating.

(2) A method wherein magnetic layers of recording media after coating and drying are contacted with each other and moved at high speeds with respect to each other to rub, grind and smooth the surfaces of the magnetic layers.

(3) A method wherein the magnetic layer surface is rubbed and ground with fur of animals, plastics, metals, ceramics, or the like.

(4) A method wherein the magnetic layer is smoothed by use of press rolls which are called the supercalender rolls.

However, the conventional methods described above present the problems as described below. Namely, in the method (1), the electromagnetic transducing characteristics, particularly the sensitivity and the signal-to-noise ratio obtained are not satisfactory. In the method (2), the drop out due to chipping of the magnetic layers caused by the grinding is so high that the method cannot be put into practice. In the method (3), it is impossible to conduct the surface smoothing required for a high-density recording medium. In the method (4), surface smoothing is conducted by passing a recording medium several times between a metal roll and a plastic roll. In this method, since the nip pressure of the supercalender rolls is high, large loads are exerted on the rolls and roll noise occurs when the rolls cannot withstand high pressures. Further, the middle portions of the rolls are thermally expanded due to heat generated by the rolls when the rolls are rotated in the pressed condition and/or due to heat for raising the roll temperature to a value within the range of 40° to 80° C. for the purpose of improving the smoothing effect. In this case, the pressing force of the rolls becomes uneven and, therefore, the thickness and/or smoothness of the magnetic recording medium obtained becomes uneven. In the case of a resilient roll, the hardness of the roll becomes uneven or the roll is cracked when the condition as described above continues for long periods.

In the cases of tapes wherein only one tape side is used for recording, for example, video tapes, audio tapes, and computer tapes, the purpose of smoothing the magnetic layer surface can be accomplished by conducting calendering with the magnetic layer surface contacting the surface of the metal roll of the aforesaid supercalender rolls. Therefore, supercalenders, including various improved types, are widely used.

However, since the supercalendering method has various drawbacks as described above, it is necessary to frequently replace the resilient roll or polish the roll surfaces. Thus, the method is troublesome in practical use. This method also has a drawback in that the pressure is too high (the linear pressure is within the range of 200 to 400 kg/cm) and that the roll itself must be heated (to a temperature of up to 80° C.). As magnetic tapes with higher recording density and higher performance come to be required, it is desirable to increase the temperature in smoothing above the working temperature of the conventional supercalender (in order to further smooth the magnetic surface). However, the smoothing temperature cannot be increased as desired for reasons of the conventional apparatus.

SUMMARY OF THE INVENTION

The primary object of the present invention is to provide a smoothing method wherein the heating temperature for smoothing can be raised easily.

Another object of the present invention is to provide a smoothing method wherein a magnetic recording medium can be smoothed at a relatively low pressure.

The smoothing method in accordance with the present invention comprises conducting the heating necessary for smoothing by a high-frequency heating system wherein a binder (dielectric material) contained in the magnetic layer of a recording medium is heated and softened through the action of a high frequency on the molecules of the binder, and simultaneously pressing the recording medium, thereby smoothing the surface of the magnetic layer. In the present invention, since the heat is generated by the molecules of the dielectric binder, it is possible to raise the temperature more easily than by the external heating system used in the conventional calendering wherein metal rolls are heated electrically, with hot water or by dielectric heating and the magnetic layer surface of a medium is heated by the rolls. Further, since heat is generated within the magnetic layer itself, it is unnecessary to heat the rolls. (To the contrary, it will be necessary to cool the rolls by passing a refrigerant through them.)

In the present invention, since the heating temperature can be controlled as desired, it is possible to decrease the pressing force of the rolls when the recording medium is passed between them. As a result, the life of the metal roll and the resilient roll becomes long. Further, since the rolls need not be heated, the life of the rolls is further prolonged.

In the conventional supercalender, three to ten pairs of pressing and heating rolls are used, and the only way to accomplish the purpose of smoothing the surface of a magnetic layer is by continuously passing the medium between these pairs of rolls. However, in the present invention, it is sufficient to use, for example, only one or two pairs or rolls. Therefore, the apparatus for carrying out the method in accordance with the present invention is inexpensive and easy to operate and maintain.

The present invention will hereinbelow be described in further detail with reference to the accompanying drawings.

DETAILED DESCRIPTION OF THE INVENTION

Figure 1:
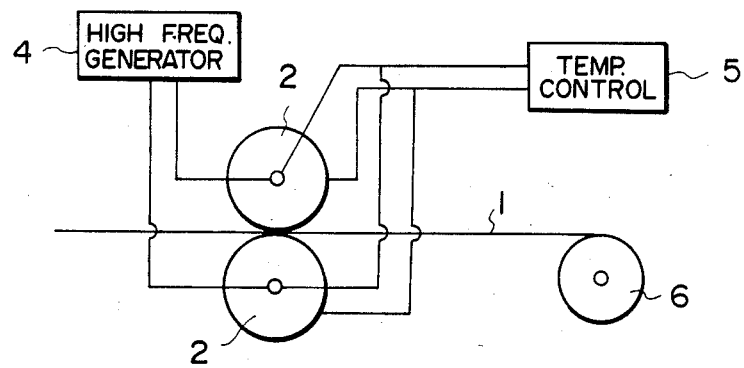
FIGS. 1 to 3 are schematic views showing various embodiments of the smoothing apparatus for carrying out the smoothing method in accordance with the present invention.

Recently, flexible magnetic recording media are formed by applying a mixture of a magnetic material and a binder to a plastic film (substrate), and drying the mixture to form a magnetic layer. As the magnetic material, a ferromagnetic material such as $\gamma$-$Fe_2O_3$, $Fe_3O_4$, Co-doped $\gamma$-$Fe_2O_3$, Co-doped $Fe_3O_4$, or $CrO_2$ is used. As the binder, for example, a vinyl chloride-vinyl acetate copolymer, a vinyl chloride-acrylonitrile copolymer, an acrylic ester-acrylonitrile copolymer, an acrylic ester-vinylidene chloride copolymer, other types of acrylic acid copolymers, a urethane elastomer, a nylon-silicone resin, nitrocellulose, a polyvinyl chloride, a vinylidene chloride-acrylonitrile copolymer, a polyamide resin, a polyvinyl butyral, a cellulose derivative, a styrene-butadiene copolymer, a phenol resin, an epoxy resin, a polyurethane, a urea resin, a melamine resin, a polyester resin, a chlorovinyl ether-acrylate copolymer, a methacrylate copolymer-diisocyanate blend polymer, an amino resin, various types of synthetic rubber, or the like may be used.

As the method of applying the magnetic coating solution, top reverse coating, bottom reverse coating, doctor coating, gravure coating, spray coating, or the like may be used. The substrate may, for example, be a non-magnetic polyethylene terephthalate film, a triacetyl cellulose film, a diacetyl cellulose film, a vinylidene chloride film, a polypropylene film, the Q Film (brand name of Teijin, Limited, in Japan) containing polyethylene naphthalate as the main ingredient, or the like. In general, the polyethylene terephthalate film is used most widely. The thickness of the substrate is, in general, within the range of $4\mu$ to $150\mu$. The magnetic coating solution applied to the substrate is dried at a temperature of about 100° C. for several minutes. In the present invention, after the magnetic recording medium is prepared as described above, the dielectric resin used as the binder in the magnetic recording medium is heated and softened by the high-frequency dielectric heating method. Then, the magnetic recording medium is pressed and smoothed between a pair of highly planished rolls which are cooled by a refrigerant to a substantially constant temperature and which also serve as the high-frequency dielectric heating electrodes. The frequency used for the high-frequency dielectric heating is within the range of several kilohertz to several thousands of megahertz, and the most preferable frequency range is from several megahertz to several hundreds of megahertz.

As described below, the smoothing method in accordance with the present invention using high-frequency heating has various advantages over the external heating method used in the conventional supercalender wherein metal rolls are heated electrically, with hot water or by dielectric heating and a medium is heated by the rolls:

(1) Heating is conducted uniformly since the heat is generated by the molecules within the dielectric binder.

(2) Since heat is internally generated in the medium, temperature unevenness in the thickness direction of the medium does not occur as it does in the case of the conventional external heating as described above. (In the conventional external heating, the surface of the medium becomes hot, but the inside of the medium does not.)

(3) The temperature of the medium rises quickly, and the temperature rise speed can be controlled as desired.

(4) When the material to be heated is a composite material comprising materials exhibiting dielectric constants or power factors different from each other, it is possible to selectively heat the material. In the magnetic recording medium, the polyethylene terephthalate film used as the substrate is not heated, and only the magnetic layer can be heated.

(5) The apparatus is inexpensive compared with the other external heating systems.

The material that can be heated by the dielectric heating at a frequency within the aforesaid range is mainly the binder used in the magnetic layer. As is well known, the dielectric constant and the dielectric power factor of a dielectric substance are the important factors in heating, and the amount of heat generated (P) can be represented by the formula $$P = k \times f \times \epsilon \times E^2 \times \tan\delta \times 10^{-12} \ (W/cm^3)$$

wherein k designates the coefficient, f denotes the frequency applied, $\epsilon$ designates the dielectric constant, E denotes the intensity of electric field, and $\tan\delta$ denotes the dielectric power factor.

Among the aforesaid binder materials used in the magnetic layer, vinyl chloride, vinyl chloride-vinyl acetate, vinylidene chloride, urethane and polyamide compounds are readily heated by dielectric heating. Particularly, vinyl chloride, vinyl chloride-vinyl acetate and vinylidene chloride compounds are very readily heated by dielectric heating.

Figure 2:
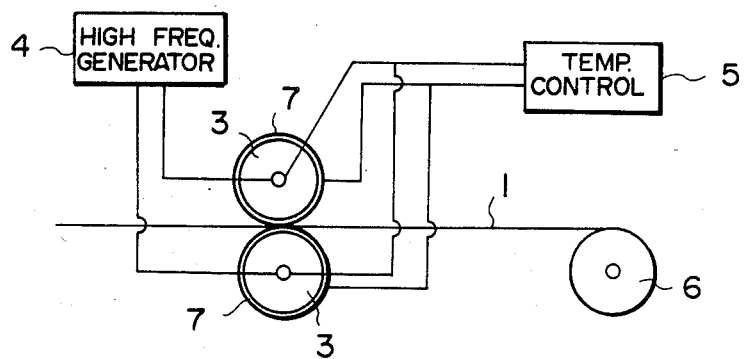
Figure 3:
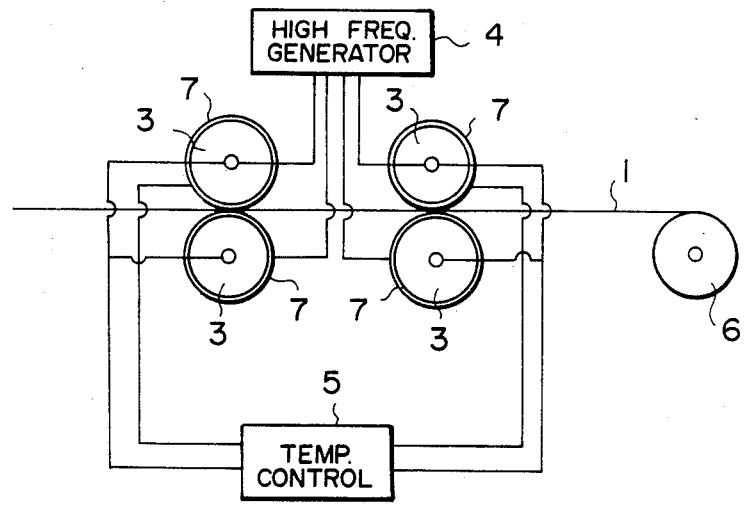

FIGS. 1 to 3 show various embodiments of the apparatus for carrying out the smoothing method in accordance with the present invention. In FIG. 1, a flexible web-like magnetic recording medium 1 is heated and pressed between a pair of metal rolls 2, 2. The metal rolls 2, 2 serve also as high-frequency dielectric heating electrodes to which a high frequency is applied from a high-frequency generator 4. The heating temperature is controlled by a temperature regulator 5. After smoothing, the web-like magnetic recording medium 1 is wound up around a web wind-up roll 6.

In FIG. 2, pressing and heating are conducted by use of rolls 3, 3 which comprise metal rolls with plastic films 7 laid on the surfaces thereof.

In FIG. 3, two pairs of rolls 3, 3 as shown in FIG. 2 are used to press and heat the web-like magnetic recording medium 1.

The press rolls serving also as high-frequency dielectric heating electrodes should be highly planished on the surfaces and involve no eccentricity as in the case of the conventional supercalender rolls. The metal rolls may be constituted by metal rolls with plastic films, flat plates, or the like provided on the surfaces thereof. The plastic films, film plates, or the like laid on the metal rolls may be made of a silicone resin, a glass fiber-containing polyester resin, an FRP, ethylene tetrafluoride (Teflon), a varnish-containing cotton cloth, a phenol resin (Bakelite), asbestos, cellophane, mica, glass, or the like.

TABLE 1

| Composition | Parts by weight |
| --- | --- |
| $\gamma$-$Fe_2O_3$ (0.4 × 0.07 × 0.07$\mu$) | 300 |
| Vinyl chloride-vinyl acetate resin | 50 |

TABLE 1-continued

| Composition | Parts by weight |
| --- | --- |
| Urethane resin | 30 |
| Plasticizer (Triphenylphosphate) | 5 |
| MEK:toluene (4:6) | 900 |

A coating solution was prepared by dispersing the composition as shown in Table 1 for 48 hours in a ball mill. Then, the coating solution was applied to a 20μ-thick polyethylene terephthalate film so as to obtain a dry coating thickness of 5μ. In this manner, a 1000 m bulk roll was obtained.

Half of the obtained bulk roll was processed in a conventional supercalender (with the magnetic surface facing the metal roll side) (metal roll temperature: 80° C., linear pressure: 300 kg/cm, web speed: 50 m/min). The remaining half of the bulk roll was processed by the smoothing apparatus in accordance with the present invention. Heating was conducted at an output of 4 kW and a frequency of 45 MHz. Pressing was conducted by use of a pair of the same planished metal rolls as the metal rolls used in the aforesaid supercalender. The temperature of both rolls was adjusted to 33°±2° C. Thus, a pair of rolls were used, the linear pressure was 80 kg/cm, and the web speed was 50 m/min.

The glossiness under 45° exposure was measured according to JIS Z 8741, and the surface smoothness of the samples was compared. (The 45° glossiness when black glass having a refractive index of 1.56 was used was taken to be 98.3 as the reference glossiness.) It was found that the glossiness of the samples processed according to the conventional supercalendering was 71, and the glossiness of the samples processed in accordance with the present invention was 95.

I claim:

1. A method of smoothing the surface of a flexible magnetic recording medium comprising a magnetic layer of a magnetic material and a dielectric resin binder by passing the magnetic recording medium between at least one set of two rolls at least one of which is a metal roll, wherein the improvement comprises using said rolls as electrodes of a high-frequency dielectric heater, feeding a refrigerant to said rolls to cool said rolls to a substantially constant temperature, applying a high frequency to said electrodes, and pressing said medium between said rolls, thereby continuously smoothing the surface of said medium.

2. A method as defined in claim 1 wherein one of said two rolls is a resilient roll.

3. A method as defined in claim 2 wherein said resilient roll comprises a metal roll and a plastic layer formed on the surface of the metal roll.

4. A method as defined in claim 1 wherein said rolls are highly planished.

5. A method as defined in claim 1 wherein said rolls are connected to a temperature regulator for controlling the heating temperature produced by said dielectric heater.

* * * * *

UNITED STATES PATENT AND TRADEMARK OFFICE
CERTIFICATE OF CORRECTION

PATENT NO. : 4,548,772
DATED : October 22, 1985
INVENTOR(S) : KAWAMATA

It is certified that error appears in the above-identified patent and that said Letters Patent is hereby corrected as shown below:

Title page:

The priority data was omitted from the patent. It should read as follows:

[30] Foreign application Priority Data

Aug. 12, 1982 [JP] Japan..........................57-140170

Signed and Sealed this

Third Day of June 1986

[SEAL]

Attest:

DONALD J. QUIGG

Attesting Officer

Commissioner of Patents and Trademarks